US006938140B2

(12) United States Patent
Louie et al.

(10) Patent No.: US 6,938,140 B2
(45) Date of Patent: Aug. 30, 2005

(54) SYSTEM AND METHOD FOR LINEAR OBJECT REALLOCATION IN PLACE

(75) Inventors: Roger Louie, Santa Clara, CA (US); Wanmo Wong, Menlo Park, CA (US)

(73) Assignee: Micron Technology, Inc., Boise, ID (US)

(*) Notice: Subject to any disclaimer, the term of this patent is extended or adjusted under 35 U.S.C. 154(b) by 293 days.

(21) Appl. No.: 10/232,841

(22) Filed: Aug. 29, 2002

(65) Prior Publication Data

US 2004/0044869 A1 Mar. 4, 2004

(51) Int. Cl.[7] .............................................. G06F 12/00
(52) U.S. Cl. ....................... 711/165; 711/156; 709/215
(58) Field of Search ................................ 711/203, 147, 711/154, 156, 165, 218; 365/185.01, 185.11, 29, 33; 709/213, 214, 215, 216

(56) References Cited

U.S. PATENT DOCUMENTS

| | | | |
|---|---|---|---|
| 4,580,211 A | | 4/1986 | Doki et al. ................. 364/200 |
| 5,394,531 A | * | 2/1995 | Smith ........................ 711/136 |
| 5,778,442 A | * | 7/1998 | Ezzat et al. ................ 711/159 |
| 6,105,115 A | * | 8/2000 | Mathews et al. ........... 711/160 |
| 6,125,424 A | | 9/2000 | Komatsu et al. ............ 711/103 |
| 6,141,251 A | | 10/2000 | Xing ...................... 365/185.11 |
| 6,141,731 A | * | 10/2000 | Beardsley et al. .......... 711/136 |
| 6,202,122 B1 | | 3/2001 | Yamada ..................... 711/103 |
| 6,327,644 B1 | * | 12/2001 | Beardsley et al. .......... 711/136 |
| 6,378,043 B1 | * | 4/2002 | Girkar et al. .............. 711/133 |
| 6,427,186 B1 | | 7/2002 | Lin et al. ................... 711/103 |
| 6,651,116 B1 | | 11/2003 | Ludwig et al. ............. 710/33 |
| 6,732,222 B1 | | 5/2004 | Garritsen et al. ........... 711/103 |
| 6,735,678 B2 | | 5/2004 | Noble et al. ................ 711/165 |
| 2003/0163660 A1 | | 8/2003 | Lam ........................... 711/170 |
| 2004/0044836 A1 | | 3/2004 | Wong et al. ................ 711/103 |
| 2004/0044840 A1 | | 3/2004 | Wong ......................... 711/105 |
| 2004/0044858 A1 | | 3/2004 | Wong et al. ................ 711/156 |
| 2004/0044859 A1 | | 3/2004 | Wong ......................... 711/156 |
| 2004/0044873 A1 | | 3/2004 | Wong et al. ................ 711/218 |

OTHER PUBLICATIONS

Int$_e$®, "Intel® Flash Data Integrator (FDI) User's Guide", Version 4, Aug. 2001, pp. ii–314.

Bach, Maurice J., "The Design of the Unix® Operating System", Bell Telephone Laboratories, Inc., Prentice–Hall, Inc., Englewood Cliffs, New Jersey, 1986, pp. xi–xiv and 271–311.

Jones, Richard, et al., "Garbage Collection Algorithms for Automatic Dynamic Memory Management", John Wiley & Sons Ltd., Chichester, England, 1996, pp. vii–xxvi and 1–41.

Silberschatz, Abraham et al., "Operating System Concepts, Fifth Edition", Addison Wesley Longman, Inc., 1998, pp. v–xii and 239–336.

Tanenbaum, Andrew S., "Operating Systems: Design and Implementation", Prentice Hall, Inc., Englewood Cliffs, New Jersey, 1987, pp. vii–xvi and 191–250.

* cited by examiner

*Primary Examiner*—Donald Sparks
*Assistant Examiner*—Brian R. Peugh
(74) *Attorney, Agent, or Firm*—Dorsey & Whitney LLP

(57) ABSTRACT

A system and method for replacing an original linear object with an updated linear object. In a flash memory or other memory device storing groups of data objects, in replacing a linear object with an updated linear object of the same size, the present invention overwrites the original linear object in the same memory space as the original version. As a result, updating the data requires erasing and writing of the block of flash memory cells where the data object is stored. A copy of the original linear object is stored so that the original version of the linear object is available for undoing the update and/or facilitating recovery if the updated linear object becomes corrupted.

78 Claims, 5 Drawing Sheets

Fig. 2

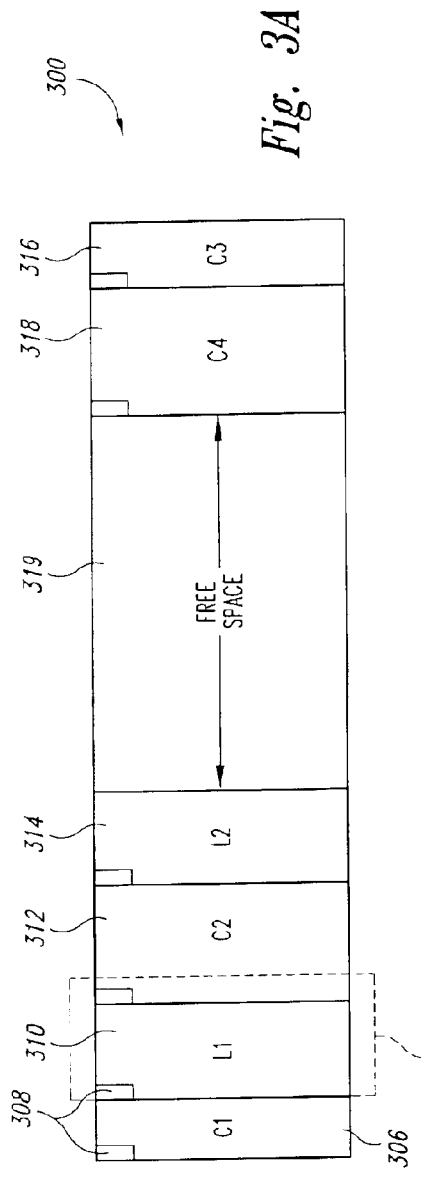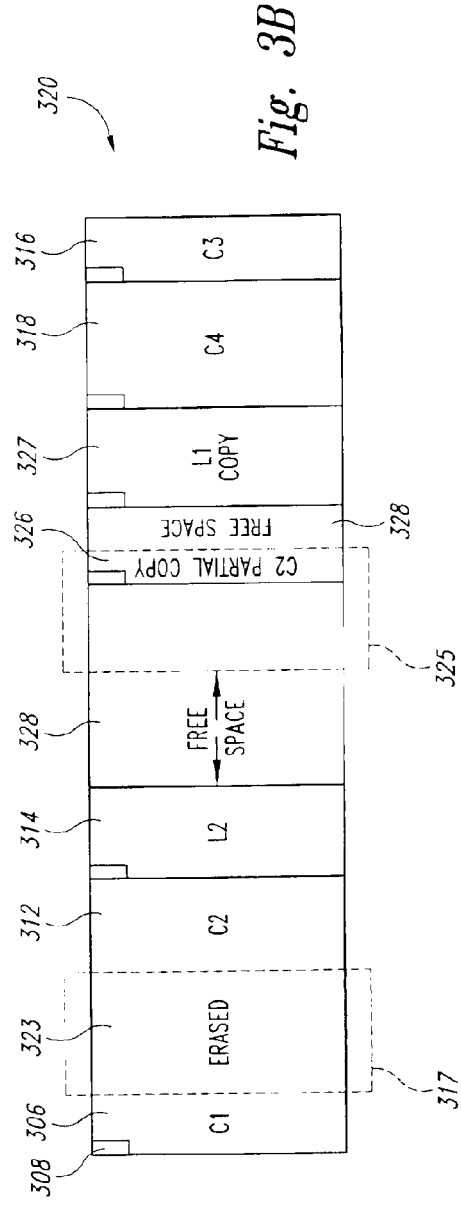

SYSTEM AND METHOD FOR LINEAR OBJECT REALLOCATION IN PLACE

TECHNICAL FIELD

The present invention relates to semiconductor memory devices. More particularly, the present invention relates to improving data management in semiconductor memory devices, such as flash memory devices.

BACKGROUND OF THE INVENTION

Non-volatile memory is a type of memory that can retain data and information even when power is not applied. An example of non-volatile memory that is being used in a variety of applications, such as cellular phone technology, is "flash memory." Flash memory is a form of electrically erasable programmable read-only memory (EEPROM), where data can be written in bytes and erased in blocks of memory. The blocks of memory typically range from 8 kBytes to 1 MByte in size. The cell density of flash memory devices can be very high, often as high as conventional dynamic random access memory (DRAM) cells, since in conventional flash memory a single floating gate structure is used for each memory cell. Flash memory devices also have relatively fast data access times. In the past, flash memory has been used in applications such as storing basic input/output system (BIOS) information in personal computers. However, with improvements in programming capabilities, and the continually increasing demand for persistent and low-power memory devices, the application of flash memory in many other areas has expanded very rapidly.

As previously mentioned, one such application is in cellular phones. At one time, cellular phones were only limited to voice communication. Now, cellular phones provide Internet access and web browsing capabilities, allow a user to capture and store computer graphic images, capture and playback video images, and provide personal digital assistant (PDA) capabilities. As a consequence, cellular phones need to be able to store different types of data and information. For example, whereas older cellular phones would only need to store data representing phone numbers, newer cellular phones need to store in addition to phone numbers, voice information, computer graphic images, small applications (e.g., Java applets) downloaded from the Internet, and the like.

The various data objects that must be stored by the flash memory have different characteristics. For example, data such as phone numbers are generally small segments of data having uniform length. Other data can be variable in length, such as voice information, where the amount of memory used depends on the length of voice information recorded. Data can be packetized, as in the case where data is downloaded from the Internet. Additionally, the amount of memory consumed by data such as voice information and image files can be considerable, spanning multiple blocks of flash memory. Application code, such as a Java applet, is unique in that the binary code must be stored contiguously in flash memory to allow for the code to be executed by a processor directly from the flash memory.

Flash memory, which is non-volatile, and has low operating power, is perfectly suited for data and information storage applications such as in cellular phones where conservation of power is very desirable. However, the operating characteristics of flash memory must be adapted to facilitate storage of the different types of data and information previously described.

Flash memory, although providing many of the characteristics required for applications in portable and remote (wireless) devices, have unique operational characteristics that need to be considered. For example, because of the floating gate structure of conventional flash memory cells, data cannot be simply overwritten. The memory cells must be erased prior to writing new data. Also, as previously mentioned, flash memory devices are designed to erase data in blocks of memory cells, rather than on a cell-by-cell basis. Thus, although only a portion of the memory cells of a block need to be updated, the entire block must be first erased before programming the new data. The process of erasing an entire block of memory cells and programming new data takes a relatively long time to complete, and deferring an erase operation is often desirable. Additionally, erasing the entire block is a problem, however, in the case where another portion of the memory cells of the block do not need to be updated. Another issue related to flash, and other floating gate memory devices, is that these memory cells have a limited life-cycle where repeated cycles of erasing and programming degrade memory cell performance. Eventually, the cell performance is degraded to such a degree that the memory cell can no longer be used to store data.

In an effort to facilitate the use of flash products in applications such as cellular phones, memory management software interfaces have been developed to make the management of data storage in flash devices transparent to the user. The memory management software carries out various operations in the flash memory such as managing code, data and files, reclaiming memory when insufficient erased memory is available for programming new data, and wear-leveling flash blocks to increase cycling endurance. Memory management typically includes functions to support storage of parameter data for EEPROM replacement, data streams for voice recordings and multimedia, Java applets and native code for direct execution, and packetized data downloads. In addition to these operations, the memory management software often ensures that in the event of a power loss, previously programmed data is not lost or corrupted. An example of this type of memory management software is Intel® Flash Data Integrator (FDI) software.

Although conventional flash memory management software has succeeded in increasing the flexibility of flash memory, there is still room for additional improvement. Conventional memory management software has limitations in the area of data management. For example, in some conventional flash memory management software, the memory space of a flash device is partitioned into fixed memory address ranges and either code or data is associated to each of the ranges. Once set at compile time, the range and the type of associated data cannot be changed without recompilation. Consequently, if at a later time a different partitioning between code and data is desired, the ranges defined for the two types of data cannot be modified unless software is recompiled. Additionally, although different flash memory management software perform many of the same functions, the process by which the functions are performed can be very different, with some being more efficient or faster than others. Conventionally, data stored across multiple segments is organized hierarchically. FIG. 1 shows blocks of flash memory storage 100 grouped into volumes 104. One of these volumes 104, Volume 1 108, is shown in detail to show how multiple segment data is stored hierarchically by a conventional method. Volume 1 108 includes a group table 112 which serves as a directory for a second level of hierarchy, the sequence tables 116. Each sequence table 116 in turn serves as a directory for a number of data read/write units 120, in which data actually are stored.

Unfortunately, the hierarchical arrangement shown in FIG. 1 can result in appreciable consumption of both time and useful erase/write cycles. Writing data to a data read/write unit 120 not only necessitates erasing and rewriting the block where the data read/write unit 120 resides, but also can invalidate both the sequence table 116 identifying the relevant data read/write units 120, and the group table 112 that identifies the sequence tables 116. Therefore, writing to a data read/write unit 120 stored in one block 100 may result in having to erase and rewrite that block, as well as also necessitating the erasing and rewriting other blocks 100 where the sequence table 116 and group table 112 reside. Having to rewrite not only the data read/write units 120, but also two levels of tables is both time consuming and also consumes the useful life of the flash memory cells by necessitating more erase and write cycles for both the flash blocks where the data are stored and where the indices are stored.

Second, the manner in which new data or index elements are created under conventional flash memory management processes leave something to be desired in terms of data recovery. Typically, when a block of flash memory must be erased to allow data in that block to be overwritten or updated, the original contents of that flash memory block will be rewritten to another block of flash memory to preserve contents that might be needed again. For example, even if only a portion of the data stored in that block must be rewritten while the remaining data is left unchanged, the entire flash memory block still must be erased. As a result, the data not to be changed is copied to another space from which it can be recopied into the newly erased space.

In some conventional processes, as soon as the copied data is rewritten, the flash block or blocks to which the data was temporarily copied are erased or freed for use in subsequent, similar operations. Accordingly, if a user of the device in which the flash memory device is used changes his or her mind about the change, the original data will have been erased or otherwise no longer available to restore the original data. In addition, if the conventional process continually uses predefined blocks of flash memory for temporary storage of such data, the useful life of the flash memory cells in those blocks may be exhausted before other cells in the same flash memory device, therefore hastening the end of the useful life of that flash memory device.

Therefore, there is a need for alternative memory management processes to allow for more flexibility in data storage in flash memory and related devices. It is to this need that the present invention is directed.

SUMMARY OF THE INVENTION

The present invention is directed to management of linear objects. In updating a linear object in a flash memory device with a revised linear object of the same size, the present invention overwrites the original linear object in the same memory space as the original version. Updating the data requires erasing and writing of blocks of flash memory cells where the linear object is stored, but requires no erasing or rewriting of tables in which that linear object is stored, saving time and avoiding the unnecessary consumption of flash memory write cycles.

While replacing a linear object in a list of data objects, the present invention makes a copy of the original linear object in a second list of data objects in the volume being updated. In an extra reserved memory block, the present invention also makes a copy of any "partial copy" data comprising part of an adjacent data object which spans the memory space that must be erased to write the updated linear object. By making copies in the second list of data objects of the linear object to be replaced and any partial copy data which needs to be erased, the data is not copied to the same area of flash memory each time. Moreover, the copy is indexed in the second list of data objects and flagged as a copy, thus, the copy is retained so that a user can choose to undo the update previously made.

BRIEF DESCRIPTION OF THE DRAWINGS

FIG. 3A is a more detailed block representation of a volume including a linear object that is to be updated using an embodiment of the present invention.

FIG. 3B is a block representation of the volume of FIG. 3A after data to be overwritten has been copied, and flash memory space to be overwritten has been erased.

DETAILED DESCRIPTION OF THE INVENTION

Embodiments of the present invention are directed to a memory management system and method that improves the process of changing or updating linear data segments, and also provides for an efficient manner of undoing these changes or updates. In the following detailed description of exemplary embodiments of the invention, reference is made to the accompanying drawings, which form a part hereof, and in which are shown, by way of illustration, specific exemplary embodiments in which the invention may be practiced. These embodiments are described in sufficient detail to enable those skilled in the art to practice the invention. However, it will be clear to one skilled in the art that the invention may be practiced without these particular details. Other embodiments may be utilized and modifications may be made without departing from the spirit or scope of the present invention. The following detailed description is, therefore, not to be taken in a limiting sense, and the scope of the present invention is defined only by the appended claims.

Figure 1:
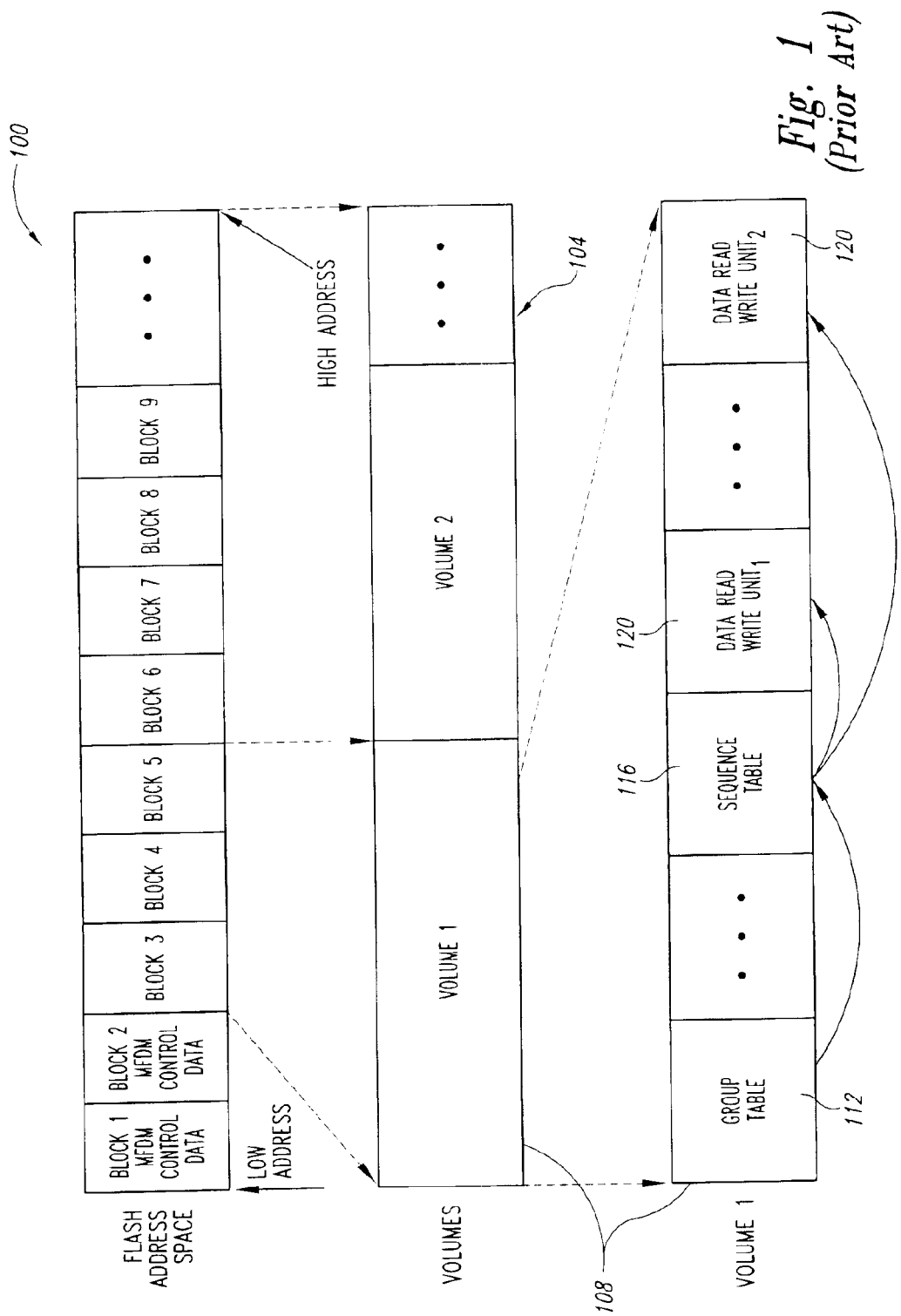
FIG. 1 is a block representation of a conventional method of storing data in volumes of a flash memory device.
Figure 2:
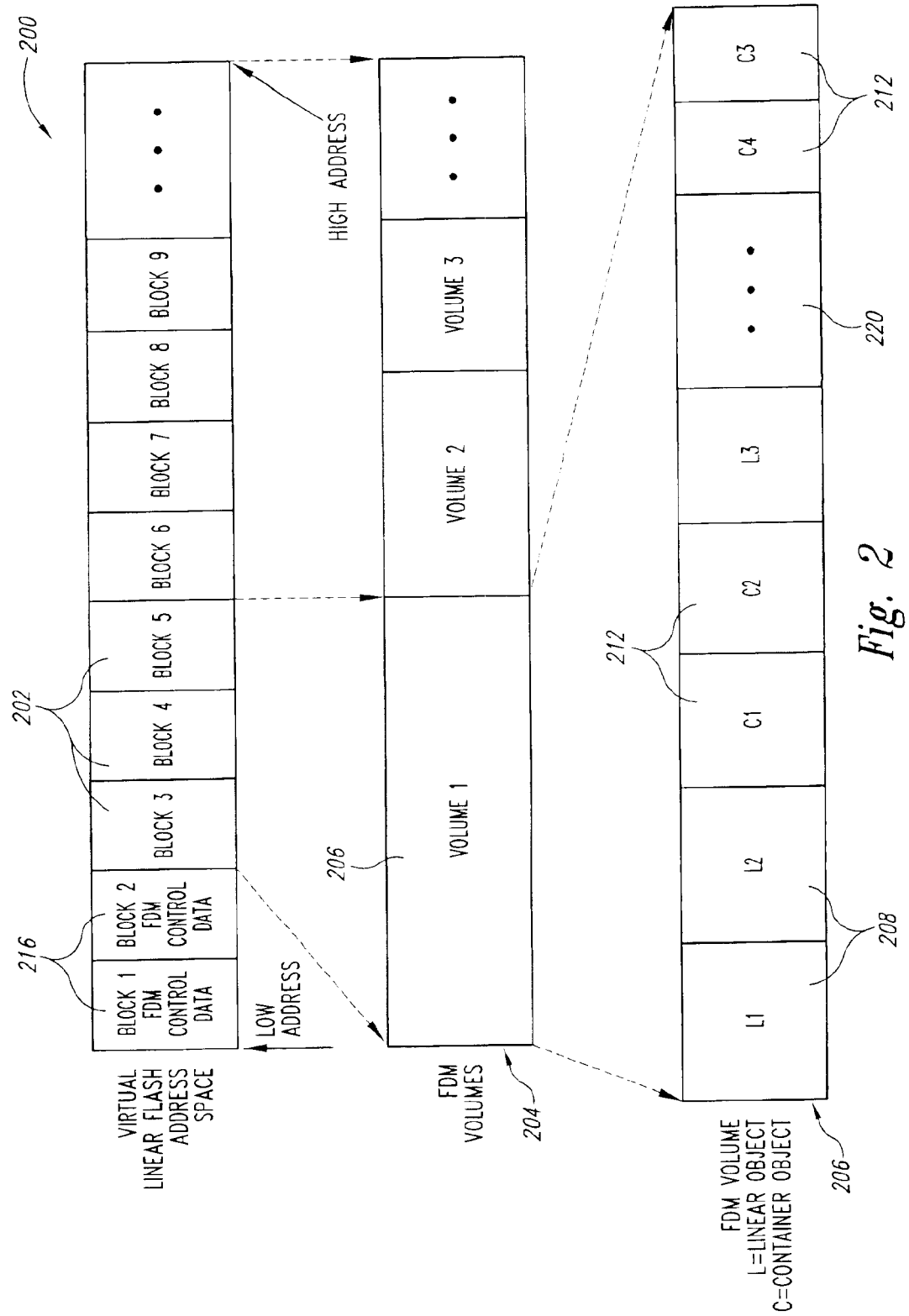
FIG. 2 is a block representation of blocks of flash memory being assigned to volumes and, in turn, designated and listed as linear objects and container objects.

FIG. 2 shows a data architecture 200 employing an embodiment of the present invention. More particularly, FIG. 2 shows a flash data manager (FDM) process which creates virtual linear flash address spaces to manage data objects in a flash device. The data architecture 200 groups flash memory blocks 202 into FDM volumes such as volume 204 shown in FIG. 2. Generally, the FDM volumes 204 can be variable in size but a multiple of a block size, and are defined by a user subsequent to compile time of the user's application. As a result, the boundaries of an FDM volume 204 can be adjusted during run time of an application. The boundary of the FDM volume 204 may be adjusted along a boundary of a flash memory block. However, the FDM volumes 204 can also span multiple flash memory blocks and have boundaries that do not need to correspond to flash memory block boundaries. In this case, additional overhead is required to process the partial flash memory blocks during erasing and writing operations, as will be explained below. In addition, a more detailed description of the FDM volumes 204 and object management thereof is provided in commonly assigned, co-pending U.S. patent application Ser. No. 10/282,962, entitled "DYNAMIC VOLUME MANAGEMENT," to Wong, filed Aug. 29, 2002, which is incorporated herein by reference.

Under FDM, within a single FDM volume, such as Volume 1 206, data can be stored in linear objects 208 or container objects 212. Linear objects 208 are those where sequential, contiguous data, such as application programs, are stored. Container objects 212 are used to collect other data records which do not have to be stored in linear sequence. Embodiments of the present invention do not necessitate partitioning the memory space of a flash memory into separate regions for linear data and non-linear data. As a result, linear objects 208 and other data, collected in container objects 212, can be stored anywhere within the available memory space of a flash memory. Embodiments of the present invention allow for more flexible use of the available memory space of a flash memory device. The memory space of the flash memory device can be utilized in an open manner, storing data objects in the available memory space independent of the particular type of data, rather than accommodating a fixed partitioned memory space where the location at which data is stored in memory is governed by the particular data type (i.e., either linear or non-linear).

Within each volume, such as Volume 1 206, the linear objects and container objects are indexed in a top list and a bottom list. The lists are indicated in FDM control data blocks 216, which store information about the FDM volumes 204. Two lists are used because, as memory space within the volume consumed by linear objects 208 and container objects 212 are released, that space can be allocated to other such objects. When there is not a contiguous memory space large enough to accommodate a particular object to be written, but the total free memory space 220 plus invalid objects can accommodate the object, the volume can be reorganized to free a particular contiguous space. The space is freed by moving valid objects from the end of either the top list or the bottom list to the opposite list until the invalid or released memory space is uncovered. Valid objects can then be reassigned between the lists until there is a sufficient block of free space between the listed objects to accommodate the new object. This process is further described below, and is also described in commonly assigned, co-pending U.S. patent applications Ser. No. 10/233,324, entitled "LINEAR AND NON-LINEAR DATA OBJECT MANAGEMENT," to Wong, filed Aug. 29, 2002, and Ser. No. 10/232,952, entitled "DYNAMIC VOLUME MANAGEMENT," to Wong, also filed Aug. 29, 2002, which are incorporated herein by reference.

In embodiments of the present invention, space in the volume must be reserved to accommodate the largest linear object and one or two additional flash memory blocks to store "partial copy" data. As is known by those ordinarily skilled in the art, data stored in flash memory cannot simply be overwritten with new data, but the flash memory cells must be erased to reset the flash memory cells, then new content can be written to those cells. Moreover, because of the structure of flash memory devices, cells cannot be individually erased, but entire blocks must be erased in their entirety. The data structure used by embodiments of the present invention can span blocks and thus make use of partial blocks of memory. Partial write data is data that consumes part of a flash memory block which is otherwise consumed by part of a data object which spans part of that same block and one or more other blocks. When a linear object is being written or updated, a copy of it is made, which requires that the volume contain enough free space into which the largest linear object can be copied. In addition, to store the partial copy data which might also be written to a block spanned by the linear object being copied, an additional physical block of memory is needed. Thus, embodiments of the present invention require enough free space to store a copy of the largest linear object and one additional memory block.

Figure 3C:
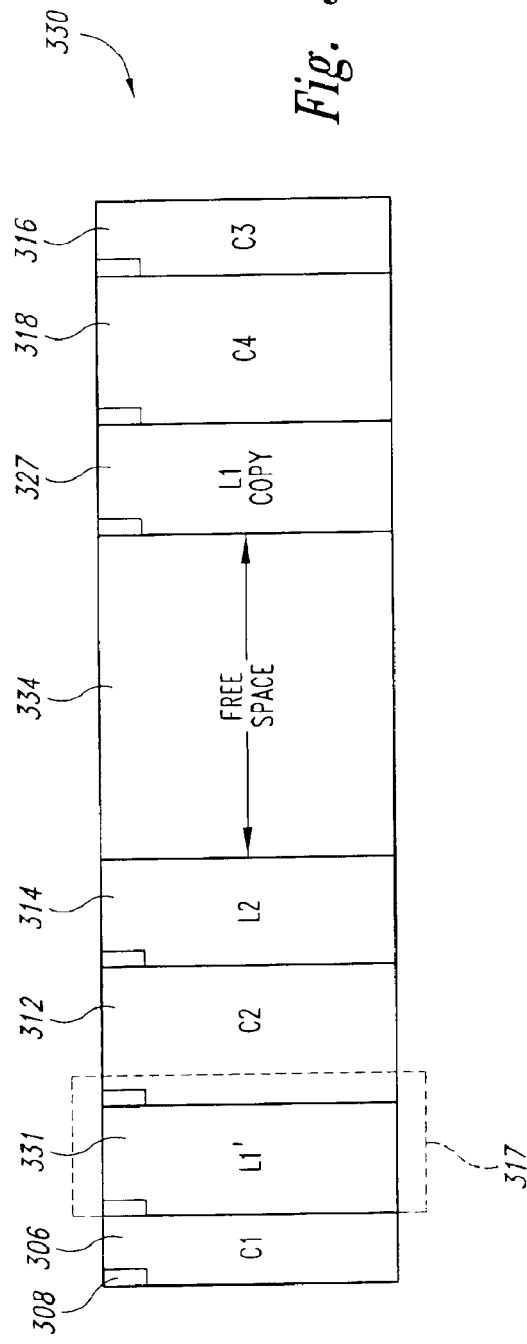
FIG. 3C is a block representation of the volume of FIG. 3B after the linear object has been updated.

FIG. 3A shows in more detail the contents of a volume 300 storing container objects and linear objects to illustrate the operation of an embodiment of the present invention. The volume 300, as previously described, indexes data objects using a top object list and a bottom object list. Each object contains an object header 308 which includes information such as a key field which allows for the object to be identified and, if it is not the desired object, skipped in accordance with an index field (not shown) that would indicate where the next object begins. In the top list, following container object 1 306 is linear object 1 310, container object 2 312, and linear object 2 314. The bottom list includes container object 3 316, which is followed by container object 4 318. At the ends of the lists is unused free space 319. Also, memory block 317 reflects a minimum unit of memory that would have to be erased in an erase/write operation. As shown in FIG. 3A, the memory block 317 comprises an area including all of linear object 1 310, and part of container object 2 312. The significance of the memory block 317 including parts of two data objects will be appreciated with the description of FIGS. 3B and 3C, below. FIG. 3A represents a hypothetical state of the volume before an embodiment of the present invention is invoked when an object is to be changed. By contrast, FIG. 3B shows a revised volume 320 showing the process employed by an embodiment of the present invention as an update is being made to linear object 1 310. Linear object 1 310 is being replaced with an updated version of the linear object having the same size as the original linear object 1 310. To update and necessarily overwrite the original linear object 1 310 in accordance with an embodiment of the present invention, first the original linear object 1 310 has to be copied to another location in the memory volume for power loss recovery purposes. This also allows the original object to be read. In addition, because the memory block 317 comprises not only the memory space consumed by linear object 1 310, but also a portion of container object 2 312, the portion of container object 2 312 included within memory block 317 also will have to be erased. So that the portion of container object 2 312 can be restored, however, this portion of container object 2 312 also must be copied, just as the original linear object 1 310 is copied. FIG. 3B shows this process.

As shown in FIG. 3B, a copy of linear object 1 310 is made and added to the end of the bottom list as linear object 1 copy 327. In part of the remaining free space 328, a spare memory block 325 is identified, and into that spare memory block the portion of container object 2 312 which will be erased with linear object 1 310 is copied. That portion of container object 2 312 is written as partial container object 2 326 in the spare memory block 325. A spare memory block 325 is reserved just for such "partial copy" data which spans part of a memory block which needs to be erased to permit the update in place operation of embodiments of the present invention.

It will be appreciated that linear object 1 copy 327 was appended to the end of the bottom list and actually added to the bottom list, while the data of partial container object 2 326 was not. The distinction exists in this embodiment because linear object 1 copy 327 may be maintained for an indeterminate period of time, thus it is important to both use available memory space wisely and not waste space between the end of the bottom list and linear object 1 copy. In addition, to preserve the option of the undo command, linear object 1 copy 327 is actually added to the list so that it can be later retrieved if needed. On the other hand, because the partial container object 2 326 is only needed until container object 2 312 can be reconstituted, and thus is only being stored very temporarily, it need not be added to a data list for easy subsequent retrieval. In addition, because it is desirable to return the spare memory block 325 used to temporarily store partial container object 2 326 to free space 328, it is preferable to write to a spare memory block 325 so that the spare memory block can be easily erased when partial container object 326 is no longer needed. Because it is preferable to write to a single, easily erasable block, this block may not align with the end of a data list, as shown by the spare memory block 325 being bordered by free space on 328. Efficient use of space for this temporary storage is not as important as choosing the location to make the space more easily erasable for later use. Nonetheless, as will be appreciated by one skilled in the art, data elements could be differently positioned in order to make the necessary copies.

Once the copies are made, memory block 317 which originally stored linear object 1 310 and the portion of container object 2 312 is erased, leaving erased memory area 323 in the space of memory block 317. Once the data to be overwritten has been copied and the memory space to be overwritten has been erased in accordance with flash memory protocols, FIG. 3C shows how the final, updated volume 330 will appear. Updated linear object 1 prime 331 is written into the space where linear object 1 310 originally appeared. Also, partial container object 2 326 (FIG. 3B) is rewritten in place where it originally appeared, reconstituting container object 2 312. Linear object 1 copy 327 is preserved in the bottom list to allow for the possibility of undoing the update. On the other hand, the spare memory block 325 is released for other memory operations. More specifically, the spare memory block will be erased to make that memory space available as free space 334. The contents of partial container object 2 326 need not be preserved in the spare block 325 (FIG. 3B) for the undo operation, because they are stored as part of container object 312. Because revised linear object 1 prime 331 represents similar information and is the same length as the object it replaced, the header information contained in the object header 308 of revised linear object 1 prime 331 will be the same as the original version. In fact, because the updated linear object being written is the same length as the linear object it replaces, the index field in each of the headers 308 still correctly indicate the location of the start of the next linear object. In other words, the newly written, revised linear object resides at the same address, thus the index field in the object header 308 of the preceding data object correctly indicates the start of the revised linear object, and the header block 308 of the revised linear object the same index field as the linear object it replaces will correctly indicate the next data object in the sequence.

For data object recovery, if power is lost or another malfunction occurs before the updated linear object 1 prime 331 is written or the updated linear object is not wanted, the original version of the linear object is still preserved in memory at linear object 1 copy 327. A field can be reserved in the object header 308 of linear object 1 copy 327 when it is copied from the original linear object 1 310 to designate it is a copy of another object, and the memory location from which the copy was made. For example, a reallocation field such as DWPHYSADDRREALLOCOBJHDR (double word physical address reallocate object header) could be inserted in the header that would have a non-address null or zero value for every type of object except for an object copy such as linear object 1 copy 327. Instead of a null or zero value, the DWPHYSADDRREALLOCOBJHDR field would carry the address of where the linear object was originally written before it was replaced by an updated linear object. Then, if the updated version was no longer wanted, the contents of the original linear object 1 copy could be copied over to its original address, as specified in the DWPHYSADDRREALLOCOBJHDR field. Because the copy would be the same size as the updated version in this case, the copy could be written in place back to its original address location after erasing as necessary in a flash memory device. Power recovery methods for data objects in structures such as those shown in FIGS. 2, 3A, and 3B are described in more detail in commonly assigned, co-pending U.S. patent applications Ser. No. 10/232,840, entitled "SINGLE SEGMENT DATA OBJECT MANAGEMENT," to Wong et al., filed Aug. 29, 2002, and Ser. No. 10/232,822, entitled "MULTIPLE SEGMENT DATA OBJECT MANAGEMENT," to Wong et al., also filed Aug. 29, 2002, which are incorporated herein by reference.

In addition to supporting data object recovery, the making of a copy also allows for an undo function. For example, if the object copied is an application or an applet which the user finds contains a bug or that the user simply preferred the original version, the user can select the undo function. Similar to the previously described data object recovery process, the copy of the original object is simply copied back into its original location after the memory area, including the original location, has been erased as necessary in accordance with known flash memory erase block/write block methodologies.

The availability of the undo function can be determined in a number of ways. Because data can be retained even when power is not applied, the undo function could survive a power failure or power off/on situation. Alternatively, the undo function could remain available as long as the application invoking the copy/undo function remains active, until the copy of the original object needs to be reclaimed to secure space for writing of additional objects, or limited by some other interval or event.

Figure 3D:
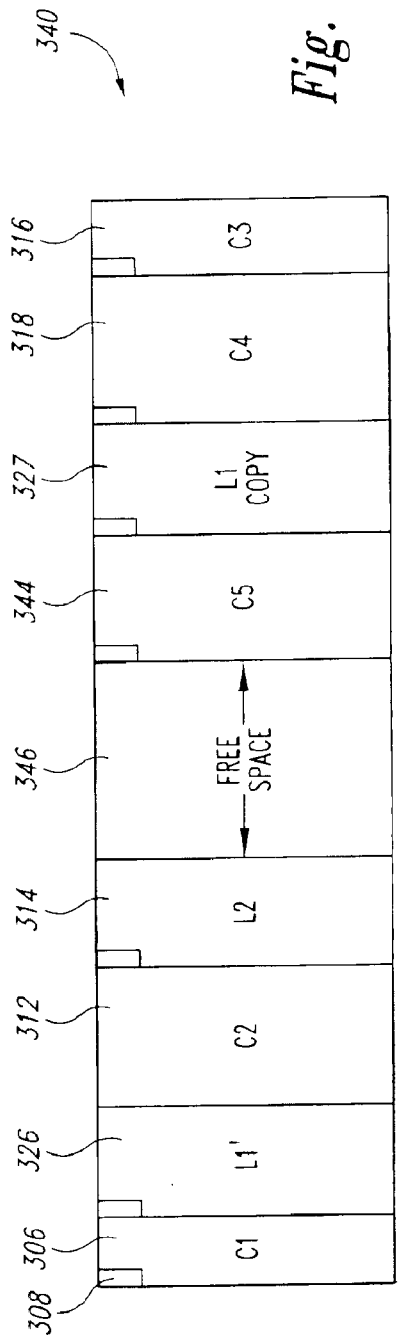
FIG. 3D is a block representation of the volume of FIG. 3A after an additional container object has been added and an unneeded copy of another object consumes space which needs to be reclaimed.

It will be appreciated by one ordinarily skilled in the art that it may be undesirable to remove the copy of the object to make the space available immediately or soon after the updated object is in place. As previously described, rewriting flash memory, is an onerous task in terms of consumption of time and finite flash cell usage cycles. It would be preferable to wait until the space consumed by the copy is actually needed. FIG. 3D, for example, shows a volume 340 similar to the volumes previously shown in FIGS. 3A and 3B, although the volume now includes another container object 5 344, leaving little free space 346. A request then is received to add an additional object, linear object 3 352 (FIG. 3E) which is too large to fit into the free space 346 (FIG. 3D) while still allowing room in the volume large enough to accommodate the largest linear object plus one or two flash memory blocks in the volume 340 as required for update operations in accordance with embodiments of the present invention. However, reclaiming the space occupied by the linear object 1 copy 327 will free sufficient space to accommodate the new object 352 and allow room to accommodate the largest linear object plus one or two flash memory blocks in the volume 330 as required. Thus, if the application for which the undo function would be supported by retaining the linear object 1 copy 327 has terminated or the undo function otherwise is no longer deemed necessary, the space occupied by linear object 1 copy 327 can be reclaimed.

Figure 3E:
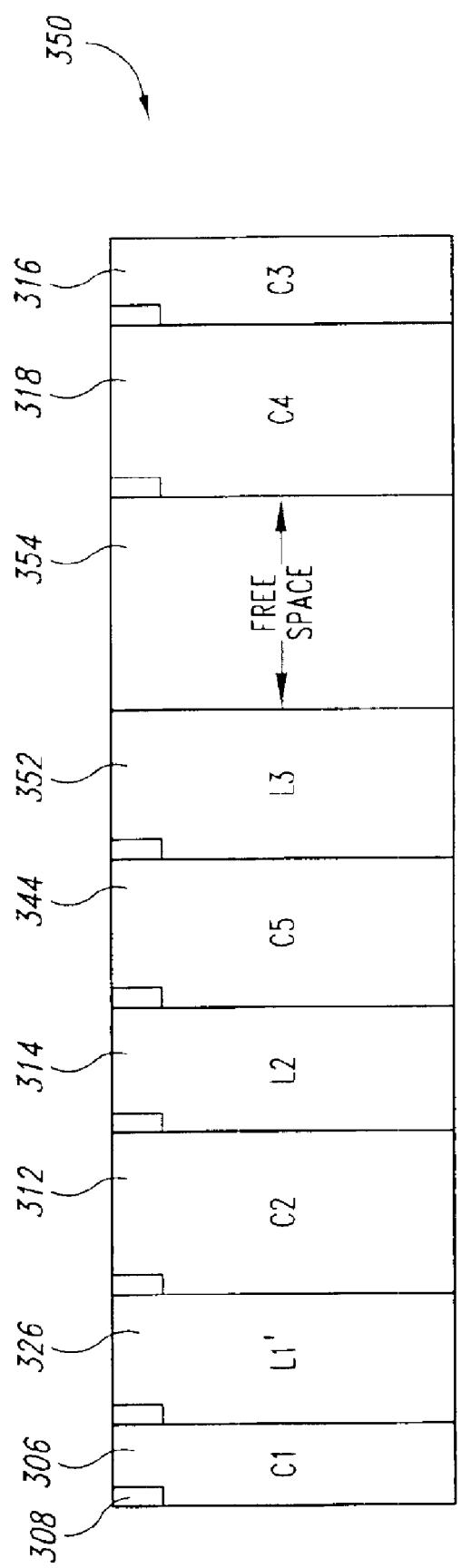
FIG. 3E is a block representation of the volume of FIG. 3D after the unneeded copy of the linear object has been erased as part of a memory reclamation process, and another data object has been added in the space made available.

To accommodate the new object, linear object 3 352 (FIG. 3E), container object 5 344 first is moved from the bottom list keyed to the top list, which is shown in FIG. 3E as the list of data objects starting at a left end of the data volume and moving from left to right. Releasing the space consumed by linear object 1 copy 327 will add contiguous space to the free space 346 (FIG. 3D) previously available. Necessarily, as with any flash memory operation, these processes occur by erasing and then writing flash memory blocks with new or relocated contents, erasing newly released memory space, then overwriting that space with new data. Ultimately, linear object 3 352 is written into its new location, leaving free space 354 for future memory update operations. As shown in FIG. 3E, linear object 3 352 is appended to the top list. Linear object 3 352 could be written to either list, but because container object 5 344 was just moved from the bottom list and that space has now been erased, writing linear object 3 to 352 could be logical for wear leveling purposes. Wear leveling in flash memory devices is described in co-pending U.S. patent applications Ser. No. 10/232,955, entitled "LINEAR OBJECT MANAGEMENT FOR A RANGE OF FLASH MEMORY," to Wong, filed Aug. 29, 2002, which is incorporated herein by reference.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A computer readable medium having stored thereon a data structure for preserving an original linear object, the data structure comprising:
    a plurality of data objects stored in one of a first list associated with a first end of a contiguous range of memory to which the data objects are related or a second list associated with a second end of a contiguous range of memory to which the data objects are related, each of the data objects comprising:
        an index field indicating a position of a next data object in a respective list;
        a key field uniquely identifying the data object;
        a reallocation field storing a non-address value; and
        a data storage area;
    an updated linear object replacing the original linear object, the updated linear object having the same data length as the original linear object and, after the original linear object is invalidated and a memory space storing the original linear object is erased, being inserted in place of the original linear object in the first list; and
    a copy of the original linear object, the copy of the original linear object being added to the second list, the reallocation field of the copy of the original linear object storing the position of the original linear object before the original linear object was replaced by the updated linear object in place of the non-address value before the original linear object was replaced by the updated linear object.

2. The computer readable medium of claim 1 wherein the copy of the original linear object being added to the second list is added to an end of the second list.

3. The computer readable medium of claim 1 wherein free space is reserved in a data volume containing the data structure sufficient to accommodate a largest linear object stored in the data volume and one or two additional memory blocks.

4. The computer readable medium of claim 3 wherein one of the one or two additional memory blocks is used to store partial copy data stored in a partially filled memory block storing part of another adjacent data object.

5. The computer readable medium of claim 1 wherein an index field of a previously preceding data object in the first list indicating a position of the original linear object in the first list indicates a position of the updated linear object in the first list.

6. The computer readable medium of claim 1 wherein an updated linear object index field indicating a subsequent data object position in the first list following the updated linear object is the same as an original object index field indicating the position of a subsequent data object in the first list.

7. The computer readable medium of claim 1 wherein a previously last data object index field in the second list indicates a position of the copy of the original linear object.

8. The computer readable medium of claim 1 further comprising an undo function allowing a command to replace the updated linear object by writing the copy of the original linear object over the updated linear object at the position of the original linear object.

9. The computer readable medium of claim 8 wherein the copy of the original linear object reallocation field is changed to the non-address value when the copy of the original linear object is written over the updated linear object.

10. The computer readable medium of claim 1 further comprising a recovery function allowing a corrupted updated linear object to be replaced by the copy of the original linear object at the position of the original linear object.

11. The computer readable medium of claim 1 wherein data space can be freed by erasing memory blocks containing the copy of the original linear object.

12. The computer readable medium of claim 11 wherein the data space is freed by moving data objects following the copy of the original data object in the second list to the end of the first list until no data objects follow the copy of the original data object in the second list and erasing the memory space containing the original linear object is stored.

13. A computer readable medium having stored thereon a data structure for storing a plurality of data objects and preserving an original linear object, the data structure comprising:
    a first list associated with a first end of a contiguous range of memory to which the data objects are related;
    a second list associated with a second end of the contiguous range of memory to which the data objects are related;

a copy of the original linear object; and an updated linear object replacing the original linear object, the updated linear object having the same data length as the original linear object and, after the original linear object is invalidated and a memory space containing the original linear object is erased, being inserted in place of the original linear object in the first list, the copy of the original linear object being added to the second list.

14. The computer readable medium of claim 13 wherein the copy of the original linear object being added to the second list is added to an end of the second list.

15. The computer readable medium of claim 13 wherein free space is reserved in a data volume containing the data structure sufficient to accommodate a largest data object stored in the data volume and one or two additional memory blocks.

16. The computer readable medium of claim 15 wherein one of the one or two additional memory blocks is used to store partial copy data stored in a partially filled memory block storing part of another adjacent data object.

17. The computer readable medium of claim 13 wherein the plurality of data objects each include an index field, each of the index fields in data objects stored in the first list indicating a position of a next data object in the first list and each of the index fields in data objects stored in the second list indicating a position of a next data object in the second list.

18. The computer readable medium of claim 17 wherein an index field of a previously preceding data object in the first list indicating a position of the original linear object in the first list indicates a position of the updated linear object in the first list.

19. The computer readable medium of claim 17 wherein an updated linear object index field indicating a subsequent data object position in the first list following the updated linear object is the same as an original object index field indicating the position of a subsequent data object in the first list.

20. The computer readable medium of claim 17 wherein a previously last data object index field in the second list indicates a position of the copy of the original linear object.

21. The computer readable medium of claim 13 wherein the plurality of data objects include a reallocation field which stores a non-address value except for a copy of the original linear object reallocation field which stores the position of the original linear object before the original linear object was replaced by the updated linear object.

22. The computer readable medium of claim 13 further comprising an undo function allowing a command to replace the updated linear object with the original linear object by writing the copy of the original linear object over the updated linear object at the position of the original linear object.

23. The computer readable medium of claim 22 wherein the copy of the original linear object reallocation field is changed to the non-address value when the copy of the original linear object is written over the updated linear object.

24. The computer readable medium of claim 22 wherein the updated linear object is written over the copy of the original linear object and an updated linear object reallocation field is changed to the position of the original linear object.

25. The computer readable medium of claim 13 wherein data space can be freed by erasing a memory space containing the copy of the original linear object.

26. The computer readable medium of claim 25 wherein the data space is freed by moving data objects following the copy of the original data block in the second list to the end of the first list until no data objects follow the copy of the original data block in the second list and erasing the memory space containing the copy of the original linear object.

27. A flash memory device having stored thereon a data structure for storing a plurality of data objects and preserving an original linear object, the data structure comprising:

a plurality of data objects stored in one of a first list associated with a first end of a contiguous range of memory to which the data objects are related or a second list associated with a second end of a contiguous range of memory to which the data objects are related, each of the data objects comprising:
an index field indicating a position of a next data object in a respective list;
a key field uniquely identifying the data object;
a reallocation field storing a non-address value; and
a data storage area;

an updated linear object replacing the original linear object, the updated linear object having the same data length as the original linear object and, after the original linear object is invalidated and a memory space comprising at least one flash memory block storing the original linear object is erased, being inserted in place of the original linear object in the first list; and a copy of the original linear object, the copy of the original linear object being added to the second list, the reallocation field of the copy of the original linear object storing the position of the original linear object before the original linear object was replaced by the updated linear object in place of the non-address value before the original linear object was replaced by the updated linear object.

28. The flash memory of claim 27 wherein the copy of the original linear object being added to the second list is added to an end of the second list.

29. The flash memory of claim 27 wherein free space is reserved in a data volume containing the data structure sufficient to accommodate a largest data object stored in the data volume and one or two additional memory blocks.

30. The flash memory of claim 29 wherein one of the one or two additional memory blocks is used to store partial copy data stored in a partially filled memory block storing part of another adjacent data object.

31. The flash memory of claim 27 wherein an index field of a previously preceding data object in the first list indicating a position of the original linear object in the first list indicates a position of the updated linear object in the first list.

32. The flash memory of claim 27 wherein an updated linear object index field indicating a subsequent data object position in the first list following the updated linear object is the same as an original object index field indicating the position of a subsequent data object in the first list.

33. The flash memory of claim 27 wherein a previously last data object index field in the second list indicates a position of the copy of the original linear object.

34. The flash memory of claim 27 further comprising an undo function allowing a command to replace the updated linear object by writing the copy of the original linear object over the updated linear object at the position of the original linear object.

35. The flash memory of claim 34 wherein the copy of the original linear object reallocation field is changed to the non-address value when the copy of the original linear object is written over the updated linear object.

36. The flash memory of claim 27 further comprising a recovery function allowing a corrupted updated linear object to be replaced by the copy of the original linear object at the position of the original linear object.

37. The flash memory of claim 27 wherein data space can be freed by erasing a memory space comprising at least one flash memory block containing the copy of the original linear object.

38. The flash memory of claim 37 wherein the data space is freed by moving data objects following the copy of the original data block in the second list to the end of the first list until no data objects follow the copy of the original data block in the second list and erasing the memory space comprising at least one flash memory block containing the copy of the original linear object.

39. A flash memory device having stored thereon a data structure for storing a plurality of data objects and preserving an original linear object, the data structure comprising:
 a first list associated with a first end of a contiguous range of memory to which the data objects are related;
 a second list associated with a second end of the contiguous range of memory to which the data objects are related;
 a copy of the original linear object; and
 an updated linear object replacing the original linear object, the updated linear object having the same data length as the original linear object and, after the original linear object is invalidated and a memory space comprising at least one flash memory block containing the original linear object is erased, being inserted in place of the original linear object in the first list, the copy of the original linear object being added to the second list.

40. The flash memory of claim 39 wherein the copy of the original linear object being added to the second list is added to an end of the second list.

41. The flash memory of claim 39 wherein free space is reserved in a data volume containing the data structure sufficient to accommodate a largest data object stored in the data volume and one or two additional memory blocks.

42. The flash memory of claim 41 wherein one of the one or two additional memory blocks is used to store partial copy data stored in a partially filled memory block storing part of another adjacent data object.

43. The flash memory of claim 39 wherein the plurality of data objects each include an index field, each of the index fields in data objects stored in the first list indicating a position of a next data object in the first list and each of the index fields in data objects stored in the second list indicating a position of a next data object in the second list.

44. The flash memory of claim 43 wherein an index field of a previously preceding data object in the first list indicating a position of the original linear object in the first list indicates a position of the updated linear object in the first list.

45. The flash memory of claim 43 wherein an updated linear object index field indicating a subsequent data object position in the first list following the updated linear object is the same as an original object index field indicating the position of a subsequent data object in the first list.

46. The flash memory of claim 43 wherein a previously last data object index field in the second list indicates a position of the copy of the original linear object.

47. The flash memory of claim 39 wherein the plurality of data objects include a reallocation field which stores a non-address value except for a copy of the original linear object reallocation field which stores the position of the original linear object before the original linear object was replaced by the updated linear object.

48. The flash memory of claim 39 further comprising an undo function allowing a command to replace the updated linear object with the original linear object by writing the copy of the original linear object over the updated linear object at the position of the original linear object.

49. The flash memory of claim 48 wherein the copy of the original linear object reallocation field is changed to the non-address value when the copy of the original linear object is written over the updated linear object.

50. The flash memory of claim 39 further comprising a recovery function allowing a corrupted updated linear object to be replaced by the copy of the original linear object at the position of the original linear object.

51. The flash memory of claim 39 wherein data space can be freed by erasing a memory space comprising at least one flash memory block containing the copy of the original linear object.

52. The flash memory of claim 51 wherein the data space is freed by moving data objects following the copy of the original data block in the second list to the end of the first list until no data objects follow the copy of the original data block in the second list and erasing the memory space comprising at least one flash memory block containing the copy of the original linear object.

53. A method of storing a plurality of data objects while preserving an original linear object, the method comprising:
 maintaining a plurality of data objects stored in one of a first list associated with a first end of a contiguous range of memory and a second list associated with a second end of a contiguous range of memory, each of the data objects comprising:
  an index field indicating a position of a next data object in a respective list;
  a key field uniquely identifying the data object;
  a reallocation field storing a non-address value; and
  a data storage area;
 replacing the original linear object with an updated linear object, the updated linear object having the same data length as the original linear object and, after the original linear object is invalidated and a memory space containing the original linear object is erased, being inserted in place of the original linear object in the first list;
 making a copy of the original linear object, the reallocation field of the copy of the original linear object storing the position of the original linear object before the original linear object was replaced by the updated linear object in place of the non-address value before the original linear object was replaced by the updated linear object; and
 inserting the copy of the original linear object in the second list.

54. The method of claim 53 further comprising adding the copy of the original linear object to an end of the second list.

55. The method of claim 53 further comprising reserving free space in a data volume containing the data structure sufficient to accommodate a largest data object stored in the data volume and one or two additional memory blocks.

56. The method of claim 55 wherein one of the one or two additional memory blocks is used to store partial copy data stored in a partially filled memory block storing part of another adjacent data object.

57. The method of claim 53 wherein an index field of a previously preceding data object in the first list indicating a position of the original linear object in the first list indicates a position of the updated linear object in the first list because the updated linear object replaces the original linear object in the first list.

58. The method of claim 57 wherein an updated linear object index field indicating a subsequent data object position in the first list following the updated linear object is the same as an original object index field indicating the position of a subsequent data object in the first list because the updated linear object has a same data length as the original linear object so that the subsequent data object in the first list remains at the subsequent data object position.

59. The method of claim 57 wherein a previously last data object index field in the second list indicates a position of the copy of the original data object.

60. The method of claim 53 further comprising an undo function allowing a command to replace the updated linear object with the original linear object by writing the copy of the original linear object over the updated linear object at the position of the original linear object.

61. The method of claim 60 further comprising changing the copy of the original linear object reallocation field to the non-address value when the copy of the original linear object is written over the updated linear object.

62. The method of claim 53 further comprising a recovery function allowing a corrupted updated linear object to be replaced by the copy of the original linear object at the position of the original linear object.

63. The method of claim 53 further comprising freeing data space by erasing a memory space containing the copy of the original linear object.

64. The method of claim 63 further comprising freeing the data space by moving data objects following the copy of the original data block in the second list to the end of the first list until no data objects follow the copy of the original data block in the second list and erasing the memory space containing the copy of the original linear object.

65. A method of storing a plurality of data objects while preserving an original linear object, the method comprising:
maintaining a first list of data objects associated with a first end of the contiguous range of memory to which the data objects are related;
maintaining a second list of data objects associated with a second end of the contiguous range of memory to which the data objects are related;
making a copy of the original linear object;
replacing the original linear object in the first list with an updated linear object after the original linear object is invalidated and a memory space containing the original linear object is erased, the updated linear object having the same data length as the original linear object; and
inserting the copy of the original linear object in the second list.

66. The method of claim 65 further comprising adding the copy of the original linear object to an end of the second list.

67. The method of claim 65 further comprising reserving free space in a data volume containing the data structure sufficient to accommodate a largest data object stored in the data volume and one or two additional memory blocks.

68. The method of claim 67 wherein one of the one or two additional memory blocks is used to store partial copy data stored in a partially filled memory block storing part of another data object.

69. The method of claim 65 further comprising writing in each of the plurality of data objects an index field, each of the index fields in data objects stored in the first list indicating a position of a next data object in the first list and each of the index fields in data objects stored in the second list indicating a position of a next data object in the second list.

70. The method of claim 69 wherein an index field of a previously preceding data object in the first list indicating a position of the original linear object in the first list indicates a position of the updated linear object in the first list because the updated linear object replaces the original linear object in the first list.

71. The method of claim 69 wherein an updated linear object index field indicating a subsequent data object position in the first list following the updated linear object is the same as an original object index field indicating the position of a subsequent data object in the first list because the updated linear object has a same data length as the original linear object so that the subsequent data object in the first list remains at the subsequent data object position.

72. The method of claim 69 wherein a previously last data object index field in the second list indicates a position of the copy of the original linear object.

73. The method of claim 69 wherein the plurality of data objects comprise a reallocation field which stores a non-address value except for a copy of the original linear object reallocation field which stores the position of the original linear object before the original linear object was replaced by the updated linear object.

74. The method of claim 69 further comprising an undo function allowing a command to replace the updated linear object with the original linear object by writing the copy of the original linear object over the updated linear object at the position of the original linear object.

75. The method of claim 74 further comprising changing the copy of the original linear object reallocation field to the non-address value when the copy of the original linear object is written over the updated linear object.

76. The method of claim 65 further comprising a recovery function allowing a corrupted updated linear object to be replaced by the copy of the original linear object at the position of the original linear object.

77. The method of claim 65 wherein data space can be freed by erasing a memory space containing the copy of the original linear object.

78. The method of claim 77 wherein the data space is freed by moving data objects following the copy of the original data block in the second list to the end of the first list until no data objects follow the copy of the original data block in the second list and erasing the memory space containing the copy of the original linear object.

* * * * *